Dec. 30, 1969  C. E. CORSON  3,486,785
FASTENING DEVICE FOR PICK-UP CAMPERS
Filed Sept. 18, 1967
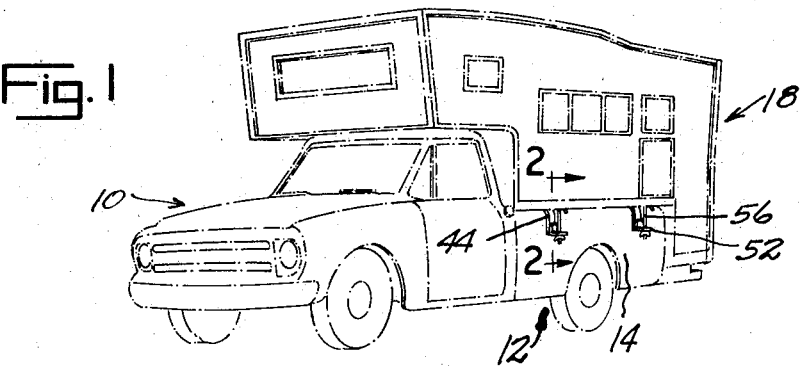
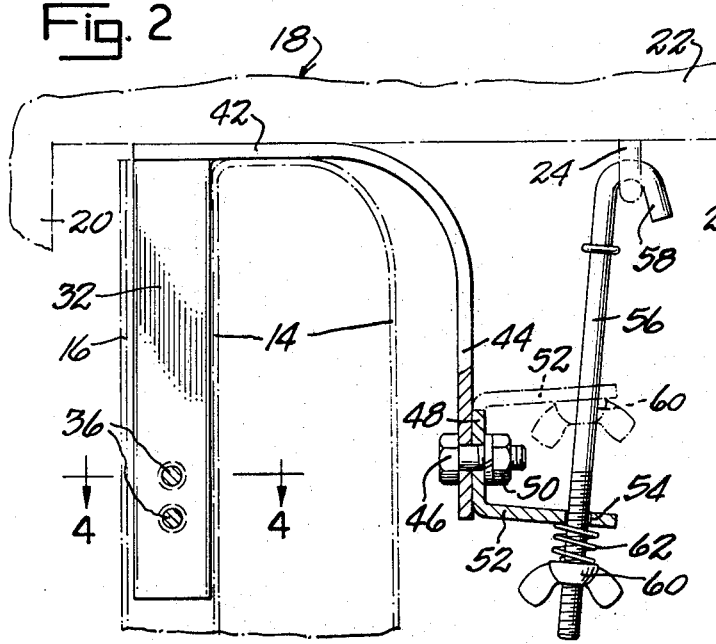
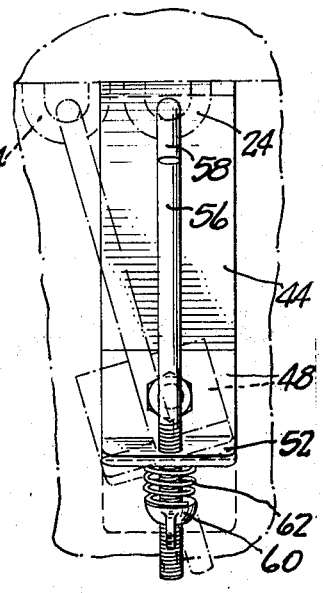
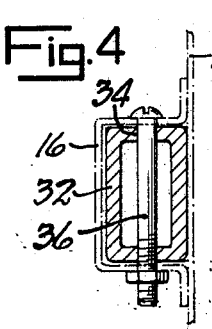
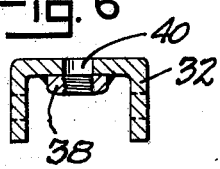
INVENTOR.
CLAUDE E. CORSON
BY
Eugene C. Knoblock
ATTORNEY

United States Patent Office 3,486,785
Patented Dec. 30, 1969

3,486,785
FASTENING DEVICE FOR PICK-UP CAMPERS
Claude E. Corson, Middlebury, Ind., assignor to Coachmen Industries, Inc., Middlebury, Ind., a corporation of Indiana
Filed Sept. 18, 1967, Ser. No. 668,321
Int. Cl. B60p 3/32
U.S. Cl. 296—23                                6 Claims

ABSTRACT OF THE DISCLOSURE

A device for fastening a camper having anchor members to a truck body having stake sockets, wherein a mounting bracket has a stake part fitting in a socket and an outwardly and downwardly extending part to which is pivoted an extension plate having an apertured part receiving the shank of a connector member swiveled to a camper anchor at one end and carrying extension-plate-engaging retainer means at its other end.

---

This invention relates to improvements in fastening devices for pick-up campers.

Pick-up campers are designed to provide living quarters for sportsmen and travelers and are mounted upon pick-up trucks. The campers commonly are characterized by a narrow base portion which will fit into the load carrying portion of the truck between the side walls thereof and an upper portion of greater width projecting laterally beyond the sides of the truck. It is necessary that the campers be firmly anchored to the truck in a detachable manner by readily operable means which can be installed readily and rapidly.

Pick-up trucks are commonly provided with stake sockets by means of which stake type side walls can be removably mounted thereon to enlarge the carrying capacity of the truck. Such stake sockets are located at different positions in trucks of different manufacture and of different models. Such stake sockets may provide means for mounting attachment members for pick-up campers, but campers of different manufacturers and different sizes and models have attachment means such as eyelets hooks or rings secured at the overhanging portion thereof at different locations, which renders difficult the matter of effecting a connection between a stake-socket-carried member upon the truck and a connector between such stake-socket-carried part and the eyelet or other securing part upon the camper. Thus prior constructions of camper anchoring devices designed to utilize the stake sockets of a truck have not been universally applicable to campers of different manufacturers and of different models.

Another type of prior means for securing a camper to a truck has been a bracket bolted or otherwise secured to a pick-up truck side wall at a location determined by the location of the anchoring rings or eyelets upon the camper to be mounted upon the truck. Devices of this character require the bolting of the bracket to the truck at holes which must be drilled in parts of the truck body at proper locations. This requires care, skill, and special tools, and the expenditure of a substantial amount of time. The securement of such brackets by bolts or welding tends to minimize their adaptability for removal, so that the brackets usually remain in place and are unsightly when the truck is being used for normal purposes without the camper. Similarly, even if the brackets are removed when the camper is removed, the drilling of holes and the contact of the brackets with the truck body tends to mar and detract from the attractive appearance of the finish of the truck and, hence, is objectionable.

Another characteristic of prior fastening devices for campers has been the use of turn buckles to effect connection between the truck-mounted bracket and the eyelet or anchor point upon the camper. Such turn buckles are objectionable to some users because of their cost, their inconvenience, or other reasons.

It is the primary object of this invention to provide a fastening device for pick-up campers which overcomes the disadvantages of prior fastening devices above outlined.

A further object is to provide a device of this character which can be anchored at a stake socket of a truck readily and easily in a secure manner which minimizes contact of the fastening device with the finished surfaces of the truck and thereby minimizes disfiguration and marring of the truck body; which accommodates secure anchoring of the camper to a truck by a connecting member which may extend at any angle in wide range of angles between the connection point of the bracket and the connection point of the camper; which is provided with an extension plate swiveled thereto and providing adjustable connection means between a truck mounted bracket and a connector extending to the camper; which utilizes a connector in the nature of a simple bolt and nut; and which accommodates the use of a spring in the connection between the truck and the camper to serve the dual function of resisting release of the nut upon the securing bolt and of tensioning the mounting of the camper upon the truck body without risk of distortion or breakage of parts incident to firm anchorage of the camper upon the truck.

Other objects will be apparent from the following specification.

In the drawing:

FIGURE 1 is a perspective view illustrating the use of the device in mounting a camper upon a pick-up truck.

FIGURE 2 is an enlarged vertical detail sectional view illustrating the construction of the mounting means and taken on line 2—2 of FIGURE 1.

FIGURE 3 is a view of the mounting means in side elevation as viewed from the right in FIGURE 2.

FIGURE 4 is a detail sectional view taken on line 4—4 of FIGURE 1 and illustrating the mounting of the device in a truck stake socket.

FIGURE 5 is a perspective view illustrating the bracket portion of the device.

FIGURE 6 is a transverse sectional view taken on line 6—6 of FIGURE 5.

Referring to the drawing which illustrates the preferred embodiment of the invention, the numeral 10 designates a pick-up truck having a load carrying body 12 characterized by side walls 14 in which are formed or which carry spacer vertical stake sockets 16. A pick-up camper 18 has a narrow lower portion 20 of a width to fit within and be supported on the bottom of the load carrying body. The camper body has laterally projecting side portions 22 having vertical and lateral clearance with the truck body side walls 14, and preferably terminating laterally outwardly spaced from walls 14 as shown in FIGURE 2. At spaced points along the sides thereof the projecting camper parts 22 may carry U-bolts, eyelets, rings or other anchor means 24 located adjacent to the outer portion of the projecting camper part.

My improved fastening device utilizes a mounting bracket or stake part 30 adapted to be mounted in each of the stake sockets 16. The mounting bracket 30 includes a stake portion 32 which is rigid and which may be of tubular cross section as illustrated in FIGURE 4 or of channel cross section as illustrated in FIGURES 5 and 6. The stake portion 32 preferably has a series of vertically spaced apertures therein at 34 at opposite sides thereof and adjacent the lower end thereof, into which fit one or more anchor bolts 36 by means of which the mounting bracket may be secured fixedly to the stake socket 16. Alternatively, as shown in FIGURES 5 and 6, the stake portion 32 may have one or more threaded nuts 38 welded thereto in register with a stake aperture 40 and with a stake socket aperture (not shown), so as to accommodate an anchor bolt (not shown) passed through such apertures and threaded in the nut 38. At its upper end the mounting bracket has fixedly secured thereto, as by welding, one end of an upper plate 42 which preferably is formed of rigid steel and terminates in a downturned portion 44. The downturned plate portion 44 is spaced from the stake portion 32 a distance sufficient to assure clearance thereof from the outer portion of the truck side wall 14 when the parts are mounted in operative relation. The parts may be so proportioned that the plate 42 rests upon the top of the truck side wall, in which event the mounting bracket is supported and anchored by the conjoint functions of contact of plate 42 with the top of truck side wall 14 and the anchorage of the bolts 36 relative to the stake portion 32 and the stake socket 16, or by the anchorage of bolts fitting in the nuts 38 of the construction shown in FIGURES 5 and 6.

The lower free end of the downturned plate portion 44 of the mounting bracket is apertured to receive a pivot bolt 46 which pivotally carries an extension plate or adjustment member 48 retained in face engagement with the plate portion 44 by a nut 50 or other retaining means. The extension plate 48 is rigid and is bent intermediate its length and spaced from bolt 46 to define an integral outturned end portion 52 having an aperture therein at 54 adjacent its outer free portion. Also, member 48 may constitute a casting. In the preferred form, the angle between the parts 48 and 52 will be slightly greater than 90°.

A connector bolt 56 has an end portion 58 which may be a return bent hook, a ring or an eyelet which can be connected to an anchoring U-bolt or eyelet 24 upon the camper for free swinging movement. The bolt shank is of a length to extend through the aperture 54 of the outturned portion 52 of the extension plate and is screw threaded to accommodate a nut 60, such as a wing nut. If desired, a coil spring 62 may encircle the shank of bolt 56 to bear against the plate end portion 52 and nut 60 at its opposite ends.

In the use of the device, the mounting brackets 30 will be secured to the truck side wall by anchor bolts or parts 36 interconnecting the stake portions 32 thereof with the stake sockets of the truck. The truck will then be manipulated relative to the pickup camper while the latter is mounted upon jacks or other supports in the manner well understood in the art so as to properly position the camper upon the bed of the truck as illustrated in FIGURE 1. Thereupon when the jacks (not shown) supporting the camper are operated to lower the camper. The only act required to complete the mounting and securement of the camper will be the manipulation of the connector bolts 56 and the nuts 60 to assembled position as illustrated in FIGURES 2 and 3. The use of bolts 56 having hook ends 58 is preferred since such bolts can easily be engaged with the camper U-bolts or eyelets 24 and with the extension plate portions 52 after the camper is positioned upon the truck body.

It will be noted that the vertical spacing of the overhanging portions 22 of the camper and its anchoring U-bolts 24 relative to the extension plate portions 52 can be accommodated by the elongated threaded portion of the bolt. Similarly, variations of the vertical dimensions of the camper can be accommodated by swinging of the extension plate 48, 52 between a lower position as shown in full lines of FIGURE 2 and an upper position as illustrated in dotted lines in FIGURE 2. Accommodation of variations of the lateral relation between the apertured extension plates 48, 52 and the anchoring U-bolts or eyelets 24 of campers of different widths which may be mounted upon a given truck is made possible by the swinging connection of the bolts 56 with the camper anchor or U-bolt 24. Longitudinal disalignment or displacement of the bolt anchoring camper U-bolt 24 relative to the truck-body-mounted-bracket 30 as may occur because of different relative longitudinal positions of the truck stake socket 16 and the camper anchoring U-bolt 24 are accommodated by the swinging by the bolt 56 relative to the camper U-bolt 24 and the swinging of the extension plate 48 and 52 about the pivot bolt 46 shown in dotted lines in FIGURE 3. Such manipulations or accommodation of lateral and longitudinal positions are also facilitated by the use of the coil spring such as 62. Thus it will be apparent that because of the variations in dimensions and locations of parts of different camper constructions and different truck body constructions which can be accommodated by the present mounting means, this mounting means is substantially universal in its application and use.

The use of coil spring 62 is optional, and it will be understood that if spring 62 is not used the nut 60 may be advanced on the bolt to bear against the bottom surface of the extension plate portion 52 or against a lock washer interposed between plate portion 52 and the lock nut. Where spring 62 is used, it serves, when compressed by tightening of the nut 60, the dual function of sustaining vibration which might tend to loosen the nut 60 and to resiliently hold the camper upon the truck body so as to dampen vibration and free play thereof without requiring tightening of parts in a manner or to an extent to tend to deform or damage the anchoring parts during use. Thus when the spring 62 is used it is not necessary to tighten the nut 60 to an extent which risks deforming thereof at its threads or deforming other parts in order to effect secure anchorage.

While the preferred embodiment of the invention has been illustrated and described herein, it will be understood that changes in the construction may be made within the scope of the appended claims without departing from the spirit of the invention.

I claim:

1. In combination, a pick-up truck having a load carrying portion including a bottom and side walls each having a plurality of spaced stake sockets therein, and a camper structure having a narrow part supported on said bottom and laterally projecting parts above said side walls carrying a plurality of spaced anchor means, the improvement comprising a plurality of mounting brackets each including a stake portion mounted and retained in a stake socket and an outwardly and downwardly extending plate portion spaced from the adjacent side wall, an extension plate pivoted to the lower free end portion of each said plate portion and having an apertured outwardly extending portion spaced from said pivot, connector bolts each having a swivel connection with an anchor means and extending through the aperture of one of said extension plates, and a retainer threaded on the lower end of each bolt below said extension plate wherein said rigid member is substantially L-shaped to define a leg pivoted to said plate at a point spaced from said apertured part.

2. The combination defined in claim 1, and a coil spring encircling each connector bolt and interposed between the retainer and the extension plate.

3. A fastening device for connecting a pick-up camper-mounted anchor means to a pick-up truck having side walls with stake sockets, comprising a mounting bracket having a stake portion adapted to be mounted and retained in a stake socket and a plate projecting outwardly and downwardly from the upper end of said stake portion, a rigid member pivotally connected to the lower free part of said plate and including an apertured part spaced from said pivot and projecting laterally outwardly from said plate, an elongated connector means anchored at said apertured part at one end and having an opposite end adapted for swiveled connection with said camper-mounted anchor means, wherein said rigid member is substantially L-shaped to define a leg pivoted to said plate at a point spaced from said apertured part.

4. A fastening device as defined in claim 3, wherein said plate is formed of rigid steel and is fixedly secured to the upper end of said stake.

5. A fastening device as defined in claim 3, wherein said connector means constitutes a bolt having a bent end for swiveled connection with camper-mounted anchor means and a threaded end extending through said apertured part and mounting a nut.

6. A fastening device as defined in claim 5, and a coil spring encircling said bolt and positioned between said nut and said apertured part.

References Cited
UNITED STATES PATENTS 3,356,408   12/1967   Stutz ---------------- 296—23
3,105,667   10/1963   Bauer ---------------- 248—361

PHILIP GOODMAN, Primary Examiner

U.S. Cl. X.R.

248—361